United States Patent [19]

Adachi et al.

[11] Patent Number: 5,998,507
[45] Date of Patent: Dec. 7, 1999

[54] THERMOSETTING POWDER COATING MATERIAL AND METHOD

[75] Inventors: Takato Adachi, Hiratsuka; Nobushige Numa, Ebina, both of Japan

[73] Assignee: Kansai Paint Co., Ltd., Amagasaki, Japan

[21] Appl. No.: 09/076,870

[22] Filed: May 13, 1998

[30] Foreign Application Priority Data

| May 14, 1997 | [JP] | Japan | 9-124047 |
| May 14, 1997 | [JP] | Japan | 9-124048 |
| May 14, 1997 | [JP] | Japan | 9-124049 |

[51] Int. Cl.⁶ .................................................. C08J 3/12
[52] U.S. Cl. ..................... 523/340; 523/330; 523/332; 528/501
[58] Field of Search .................... 523/330, 332, 523/340; 528/501

[56] References Cited

U.S. PATENT DOCUMENTS

| 3,870,684 | 3/1975 | Witt et al. | 260/75 |
| 4,402,983 | 9/1983 | Craven | 524/91 |
| 4,945,128 | 7/1990 | Hille | 524/591 |
| 5,075,372 | 12/1991 | Hille | 524/840 |
| 5,270,416 | 12/1993 | Toman | 524/904 |
| 5,354,799 | 10/1994 | Bennett | 523/333 |
| 5,439,896 | 8/1995 | Ito | 524/545 |

FOREIGN PATENT DOCUMENTS 2 305 926   4/1997   United Kingdom .

*Primary Examiner*—Paul R. Michl
*Attorney, Agent, or Firm*—Foley & Lardner

[57] ABSTRACT

A method for preparing a thermosetting powder coating material comprising: dispersing and mixing a base resin and a crosslinking agent in a dispersing and/or mixing machine equipped with a decompression device at a temperature in the range of 40 to 200° C., to form a dispersed mixture, the dispersed mixture optionally containing a solvent and a pigment; optionally eliminating at least a portion of the solvent under reduced pressure; adding water to the dispersed mixture; reducing the pressure and lowering the temperature of the dispersed mixture to a temperature equal to or less than the softening point of the dispersed mixture; and bringing the dispersed mixture into a powder state or a granule state by dispersion force of the dispersing and/or mixing machine.

15 Claims, No Drawings

THERMOSETTING POWDER COATING MATERIAL AND METHOD

BACKGROUND OF THE INVENTION

1. Field of the Invention

The present invention relates to a method for preparing a thermosetting powder coating material as well as to powder coating materials per se.

2. Description of Related Art

Heretofore, a thermosetting powder coating material is prepared by dryblending a base resin, a crosslinking agent, and if necessary, a pigment and an addition agent using a mixer, then cooling and grinding them. However, this preparation method has some problems. For example, it is generally a complicated process because the preparation includes a mixed melting with heating after dryblending, which can easily lead to topical heating because temperature control is difficult when a mixed melting and heating are employed. Thus, due to the fear of increased viscosity and gelation, a low temperature curing type coating material generally is difficult to prepare. In addition, such processes also have problems relating to insufficient dispersion of pigment and crosslinking agent. Thus, the final finished appearance and curability are generally not as desired when a dispersion of pigment and a crosslinking agent is accomplished by mixed melting in the two axes extruder. Moreover, the above-mentioned method for preparing a powder coating material is generally not appropriate for preparing a powder coating material when many colors are required for an enamel system coating material, because cleaning the two axes extruder and the like often takes a lot of time.

Furthermore, the thermosetting powder coating material is often applied to form a thick film in contrast to a solvent type coating material. As such, it often volatilizes only to a small extent upon curing, so that internal stress is easily generated. Thus a coating film prepared in this way inconveniently tends to peel off by water and/or heat. Additionally, in the thermosetting powder coating material, a relatively hard compound is used in large quantities to provide antiblocking properties. Therefore, inconveniently, the flexibility of the coating film is often insufficient and antichipping properties can be poor.

As such, providing a dispersion of fine particles in the powder coating material can be carried out to relieve the internal stress and to improve the antichipping properties. However, when the fine particles of a synthetic resin having a low glass transition temperature dispersed in water are heated and dried, these particles become molten and their re-dispersion is almost impossible. Furthermore, even if these particles are freeze-dried, aggregates of several microns are formed, and even if these particles are dispersed at the time of the melting and kneading, they cannot be dispersed as primary particles. As such, the use of fine resin particles alone generally cannot contribute to the improvement of the physical properties of the coating film.

SUMMARY OF THE INVENTION

In an effort to solve one or more of the above identified problems as well as others, the present invention intends to provide a method which is capable of quickly and easily preparing a thermosetting powder coating material wherein the properties of the finished or final coating, the hardening properties of a coating film, the antichipping properties, the adhesiveness, the processing properties, and the like, are satisfactory or superior.

In accordance with these and other objectives, there is provided a method for preparing a thermosetting powder coating material comprising: dispersing and/or mixing a base resin and a crosslinking agent in a dispersing and/or mixing machine equipped with a decompression device at a temperature in the range of 40 to 200° C., to form a dispersed mixture, the dispersed mixture optionally containing a solvent and a pigment; optionally eliminating at least a portion of the solvent under reduced pressure; adding water to the dispersed mixture; reducing the pressure and lowering the temperature of the dispersed mixture to a temperature equal to or less than the softening point of the dispersed mixture; and bringing the dispersed mixture into a powder state or a granule state by dispersion force of the dispersing and/or mixing machine.

In further accordance with these and other objectives, there is also provided powder coatings and powder coating dispersions.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF PREFERRED EMBODIMENTS

By carrying out a dispersion of a base resin and a crosslinking agent at as low temperature as possible and effectively, and by more homogeneously dispersing a pigment and fine particles of a synthetic resin, it is possible to achieve good results.

The present inventors have intensively researched to solve the problems identified above, and as a result, they have found that it is possible to prepare a thermosetting powder coating material wherein its preparation is easy, the dispersing property of the pigment employed is satisfactory and the properties of the finished film and a film coating properties are excellent. Such a powder coating material is achieved, for example, by carrying out the elimination of at least a portion of solvent contained in one or more of the base resin, the dispersion of a crosslinking agent, the dispersion of a pigment, the dispersion and powderization of fine particles of synthetic resin at one time by the use of a dispersing and/or mixing machine equipped with a decompression device. In preferred embodiments, substantially all or all of the solvent included in the components forming the powder coating material mixture is eliminated at one time.

Any dispersion and/or mixing machine can be used in the present invention. In preferred embodiments, a decompression device is used which is capable of efficiently dispersing even a highly viscous coating material, and more preferably, a dispersing and/or mixing machine or a combination dispersing and mixing machine is used. In preferred embodiments, the machine employed is equipped with a heater. Examples of suitable dispersion mixing machines include tradenames Eirich Mixing Reactor R02Vac and R08Vac made by Nippon Eirich Co., Ltd.

Any base resin can be used in the present invention. In the present invention, when a substance to be synthesized in the dissolved state in an organic solvent (also referred to as "the varnish") is used as a base resin for a thermosetting powder coating material component, a depressurization can preferably be carried out, for example, by mixing a crosslinking agent and/or a pigment and, if necessary, an adding agent such as a dispersing agent, and the like together in the dispersing/mixing machine with a decompression device. Next, a portion of or all of the solvent can be, and preferably is, distilled away by depressurizing.

On the other hand, when a base resin is used which does not contain a solvent, it can be dispersed after it is allowed to be in the melted state with heating (i.e. melted) and then the crosslinking agent and/or the pigment and, if necessary, an adding agent such as a dispersing agent, a dispersion supporting agent or the like can be added thereto. The dispersion may be carried out merely by melting with heating; however, the inclusion of an organic solvent therewith is often more preferable because including an organic solvent generally permits a reduction in the dispersion temperature and also permits the formation of a homogeneous dispersion.

Any dispersion temperature can be used depending on the application. The dispersion temperature is preferably in the range of 40 to 200° C. Should the temperature be less than about 40° C., the viscosity rises so that stirring can become difficult. On the other hand, grinding of the mixture may become difficult if temperatures of more than about 200° C. are employed.

Any pigment can be used in the present invention. The pigment in the thermosetting powder coating material component may be, for example, a previously dispersed pigment paste including the resin, the organic solvent and the pigment. In another embodiment, the pigment can comprise solid state pigment chips. Any organic solvent in the pigment paste may be depressurized and distilled away, if desired for any reason, before the crosslinking agent is added thereto. Alternately, the solvent can be retained when the crosslinking agent is dispersed. In addition, the resin used in dispersing a pigment paste or pigment chips may be the same or different than the base resin.

The components of the mixture can be dispersed in any order. With regard to a dispersion order of the crosslinking agent and the pigment, it may be preferable in some embodiments to disperse the crosslinking agent after the pigment is dispersed. This is because, for example, with regard to a component that takes a substantial amount of time to disperse, there may be fear or a potential that a crosslinking reaction will partially proceed at a temperature and time for pigment dispersion so as to generate a gelled substance. This may cause the properties of the finished or final coating to deteriorate to some extent.

By carrying out a depressurization after water is added to the dispersed mixture, or by adding the water into the dispersing/mixing machine at one time using a pressure difference after a depressurized state is obtained, it is possible for water to be evaporated at one time so that the temperature of the dispersed substance rapidly drops down to below the softening point due to its heat of evaporation (or vaporization). A dispersed mixture allowed to be in this state (at or below its softening point) can generally be easily ground by using dispersion forces of the dispersing/mixing machine.

In preferred embodiments, a thermosetting powder coating material in a granule state has a particle diameter preferably in the range of 1 to 10 mm. Such particle sizes are generally obtainable using the instant method. When water remains in the thus obtained powder coating material, the thermosetting powder coating material with the desired particle diameter can generally be obtained by grinding the dispersed mixture using a grinding machine or the like, preferably after water is distilled away by drying with a depressurization. And in addition, cleaning the machine is generally very easy because the thermosetting powder coating material obtained using a dispersing/mixing machine of the present invention is in a granule state, its adherance to the inside of the dispersing mixing machine is minimal. This is because, inter alia, a gelatinized substance is generally not generated, so that the present invention is extremely suitable as a method for preparing a powder coating material in an enamel system wherein a change of a color is required.

When the crosslinking agent and the pigment are dispersed by melting, remaining portions of solvent or organic solvent if present may be used without distilling away all the solvent by depressurization (for example, in a varnish). Alternately, all the solvent may be added thereto after distillation is carried out. And in addition, an organic solvent added when the pigment is dispersed may be distilled away after the pigment is dispersed. Although the type of organic solvent wherein the crosslinking agent and the pigment are dispersed with melting should not especially be limited, an organic solvent which is azeotropic with water is preferably used in order to minimize remaining organic solvent after the thermosetting powder coating material dispersed mixture is powdered or granulated. Typical examples of the above organic solvent include isopropanol, n-butanol, isobutanol, sec-butanol and toluene.

Any amount of the optional solvent (which may be an organic solvent) can be employed. The amount of the organic solvent wherein the base resin and the crosslinking agent are dissolved can suitably be less than 80% by weight, more preferably less than 50% by weight based on the total solids in the base resin and the crosslinking agent after water has been added thereto. When the amount of an organic solvent in which the base resin and the crosslinking agent are dissolved exceeds about 80% by weight, the solvent may not be capable of being sufficiently distilled away after water is added thereto even if a depressurization is carried out. Moreover, the solvent may not be sufficiently distilled away and remain even if it is afterward dried with a depressurization. As a result, antiblocking properties of the gained thermosetting powder coating material may become worse in some situations if the solvent content exceeds about 80% by weight based on the solid content of the base resin and the crosslinking agent.

Any amount of water can be employed in the instant process. The amount of water added can suitably be in the range of 2 to 120% by weight, preferably in the range of 5 to 80% by weight based on the total amount of solids part of the base resin and the crosslinking agent. When the amount of water to be added is less than about 2% by weight, there may not be sufficient evaporation of latent heat required to lower the dispersed mixture of the thermosetting powder coating material component to a value at or below its softening point. Thus, grinding may be impaired. Furthermore, when the amount of water added thereto is more than about 120% by weight, a large amount of water may remain after grinding, which could be undesirable in some circumstances. As such drying may need to be carried out under reduced pressure for long time periods.

Moreover, in preferred embodiments, the softening point of the dispersed mixture of the thermosetting powder coating material component should preferably be in the range of 30 to 130° C., more preferably in the range of 40 to 100° C. When the softening point of the dispersed mixture of the thermosetting powder coating material component is less than about 30° C., the required hardness for grinding may be difficult to obtain; thus grinding of the mixture may not be successful and a fused mass might be made. On the other hand, if the softening point exceeds about 130° C., although it would likely be possible to grind the dispersed mixture, a sufficient flowing property as a thermosetting powder coating material may not be possible. In addition, softening points above about 130° C. may cause a reduction in the properties of finished or final coated materials.

As the base resin constituting the thermosetting powder coating material, any resin can be used. Advantageously, a synthetic resin can be used which contains a functional group capable of melting and flowing itself by heating, and which is capable of hardening with a crosslinking agent and/or with a hardening catalyst. Typical examples of the base resin include acrylic resins, polyester resins, epoxy resins and fluororesins, and they can be used singly or in a combination of two or more thereof. Examples of the functional group contained in these resins include a hydroxyl group, a carboxyl group, an epoxy group and a blocked isocyanate group.

In the base resin which can be used in the present invention, the glass transition temperature (Tg) is preferably in the range of 40 to 100° C., more preferably in the range of 50 to 80° C. It is not preferable that the glass transition temperature be less than about 40° C., because antiblocking properties of the powder coating material may be inferior. On the other hand, it is not preferable that the glass transition temperature be more than about 100° C., because the finished appearance of a coating film (such as smoothness) may be inferior in some circumstances.

The glass transition temperature mentioned above can be obtained for example, as follows. A specimen is weighed on a sample pan by the use of the differential scanning calorimeter (DSC), heated up to 100° C., allowed to stand for 10 minutes, and then rapidly cooled down to −20° C. Afterward, the temperature is raised at the speed of 10° C./minute, and a glass transition temperature described above is capable of being gained.

The number average molecular weight of a base resin is preferably in the range of 1,000 to 100,000, more preferably in the range of 2,000 to 30,000. When the number average molecular weight is less than about 1,000, grinding of the resin may not be successfully carried out because the hardness for grinding may be difficult to achieve, so that a fused mass is made. On the other hand, when the number average molecular weight is more than about 100,000, the powder coating material itself may become rigid and form a large mass and may be difficult to grind; so molecular weight values above about 100,000 are also not preferable.

In a preferred embodiment, the crosslinking agent reacts with a functional group contained in a base resin, it forms a cured coating film, and its typical examples include, for example, the following substances.

(1) Examples reacting with a base resin containing hydroxyl group include an amino resin, a blocked isocyanate compound and the like. And examples of an amino resin include a hexamethoxymelamine resin and the like, and examples of a blocked isocyanate compound include an aliphatic such as isophoronediisocyanate, hexamethylenediisocyanate, (hydrogenated) xylylenediisocyanate, (hydrogenated) tolylenediisocyanate, an alicyclic or aromatic polyisocyanate compound blocked by a blocking agent such as a phenol class, a caprolactam class, an alcohol class and the like.

(2) Examples reacting with a base resin containing carboxyl group include tris (epoxyisocyanate), (hydrogenated) bisphenol A, Calloxido 2021, EHPE-3135 (any one of these is a polyepoxy compound made by Daicel Chemical Industries, Ltd.).

(3) Examples reacting with a base resin containing epoxy group include a polycarboxylic acid such as dodecanoic diacid, piperic acid, azelaic acid, itaconic acid, terephthalic acid, isophthalic acid, phthalic acid, trimellitic acid, pyromellitic acid, hexahydrophthalic acid, hexahydroisophthalic acid, methylhexahydrophthalic acid, and (poly) acid anhydrides thereof.

(4) Examples reacting with a base resin containing blocked isocyanate group include a polyol compound such as trimethylolpropane, neopentyl glycol and the like.

In the present invention, if necessary, a hardening catalyst may be used. Typical examples include an organic acid such as paratoluenesulfonic acid, dodecylbenzenesulfonic acid, and an acid catalyst of an inorganic acid such as phosphoric acid for the reaction between hydroxy group and amino group, and an organotin catalyst such as tetrabutyl tin, dibutyldilauryl tin, tetrabutyldiacetylstannoarsenic acid for the reaction between hydroxy group and blocked isocyanate group, and an acid class such as a boron trifluoride, an amine, an alkaline earth metal hydroxide, a tertiary onium salt, a quaternary ammonium salt for the reaction between carboxyl group and epoxy group. For a base resin containing epoxy group, by the use of a polymerization catalyst such as benzyl-4-hydroxyphenylmethylphosphonium-hexafluoronate, cured coating film can be obtained without using the crosslinking agent.

In a method for preparing a powder coating material in the present invention, the pigment used for preparing a colored powder coating material is not limited. Typical examples of the pigment include an azo class pigment as Fast Yellow, a phthalocyanine class pigment such as Phthalocyanine Blue and Phthalocyanine Green, a condensed polycyclic class pigment such as Quinacridone Red and Perylene Red, a nitroso class pigment such as Naphthol Yellow, an oxide class pigment such as titanium dioxide and red iron oxide, a phthalocyanine class pigment such as Prussian Blue, a chromate class pigment such as Molybdenum Red, a carbon class pigment such as carbon black, a mica class pigment such as colored mica, metal powder pigment such as scaled aluminum powder, bronze powder, zinc powder. And in addition, these pigments may be coated, for example, by a pigment dispersing agent. In addition, a pigment dispersing agent or the like may be added thereto when the pigment is dispersed.

In a method for preparing a powder coating material in the present invention, for the purpose of improving adhesiveness and antichipping properties of the obtained powder coating material, before water is added to the dispersed mixture of the thermosetting powder coating material component, a water-dispersed substance of fine particles of a synthetic resin may be added. The fine particles of synthetic resin preferably have a glass transition temperature of less than 40° C., more preferably less than 20° C. especially preferably less than 0° C. The particles can be added to the above mixture and dispersed.

Examples of the mentioned water-dispersed substance of fine particles of a synthetic resin include a substance obtained by carrying out an emulsion polymerization of an ethylenic unsaturated monomer (for example an alkyl ester of acrylic acid or methacrylic acid, styrene and the like).

The particle diameter (average) of the mentioned fine particles can suitably be in the range of 0.01 to 1 μm. When the diameter of the fine particles is less than about 0.01 μm, an improvement of the adhesiveness and antichipping properties of the hardened coating film may not be very great. On the other hand, when the diameter of the fine particles added is more than about 1 μm, the property of the finished coating may be reduced and an improvement of the adhesiveness and antichipping properties of a cured coating film may be minimized.

In addition, the amount of the optional fine particles added thereto can suitably in the range of 1 to 40% by weight of the solid part based on the total amount of the solid part of the base resin and the crosslinking agent. When the amount added thereto is below about 1% by weight, an improvement of the adhesiveness and antichipping properties of a cured coating film may be minimal. On the other hand, when the amount added thereto is more than about 40% by weight, the properties of the finished coating may be lowered and an improvement of the adhesiveness and antichipping properties of a cured coating film may not be very substantial.

Furthermore, in the present invention, some additives which are usually blended in the coating materials can be used in addition to the above-mentioned components, if desired or necessary. Any known additive can be included in the present invention. Examples of suitable additives include, for example, an antipopping agent, a surface controlling agent, an antioxidant, an ultraviolet rays absorber, an ultraviolet rays stabilizer, a blocking inhibitor, a flow controlling agent, an antistatic agent, and a filler. These additives may be used singly or in any combination depending on the intended application.

A powder coating material ground by the dispersing mixing machine equipped with the decompression device may be dried by depressurization, then ground into fine particles by a known procedure or the like, and then filtered if necessary or desirable by using an appropriate sieve, so that a thermosetting powder coating material having the desired diameter of a particle can be obtained. Any particle diameter can be employed depending on the desired application. The diameter of a particle of the mentioned thermosetting powder coating material can suitably be in the range of 1 to 100 μm, more preferably in the range of 5 to 60 μm.

The thermosetting powder coating material obtained by the present invention is generally capable of forming a cured coating film wherein the setting properties and the properties of the final or finished coating are excellent. Such a coating may be achieved, for example, by coating a coated substance with a powder coating material and then heating it (e.g., at 160° C. for 30 minutes). Coating with a powder substance can be carried out, for example, by using a known method such as the electrostatic powder material coating (a corona charging method, a friction charging method or the like) or a flow immersion as nonlimiting examples.

EXAMPLES

Next, the present invention will be described in more detail in accordance with examples which explain, but do not limit the invention.

Example 1

1,539 parts by weight (solid content=1,000 parts by weight) of an acrylic varnish (number average molecular weight=5,000, solvent=toluene, resin solid content=65% by weight, resin softening point=80° C. and Tg=50° C.) comprising 35% by weight of glycidyl methacrylate, 15% by weight of styrene, 20% by weight of methyl methacrylate and 30% by weight of n-butyl acrylate was placed in an Eirich Mixing Reactor R02Vac, and pressure was reduced at 80° C. and toluene was then distilled off. After atmospheric pressure was returned, 250 parts by weight of dodecanoic diacid (average particle diameter=1 μm) was put thereto, and a stirring speed was then accelerated. When the temperature rose up to 120° C. over about 5 minutes by stirring heat, 500 parts by weight of water was added, and the pressure was reduced again. In consequence, the temperature of the system immediately lowered to 30° C., and the powder coating material composition was ground by a dispersion force of a dispersing machine, whereby solid particles having a particle diameter of 1 to 10 μm were obtained. Afterward, the solid particles were dried under reduced pressure for 1 hour while dispersed, and the dried particles were then ground by a pin disc mill. Next, the ground composition was filtered through a filter of 150 mesh to obtain a thermosetting clear powder coating material.

Example 2

The same procedure as in Example 1 was conducted except that a dispersion temperature of dodecanoic diacid was 100° C., thereby obtaining a thermosetting clear powder coating material.

Example 3

The same procedure as in Example 1 was conducted except that a dispersion temperature of dodecanoic diacid was 80° C., thereby obtaining a thermosetting clear powder coating material.

Example 4

The same procedure as in Example 1 was conducted except that an apparatus equipped with a stirring motor for a high viscosity having an anchor-shaped stirring blade and a baffle, an electrothermic jacket for warming a reactor, and a decompression device (a condenser and a vacuum pump) was used, thereby obtaining a thermosetting clear powder coating material.

Example 5

An acrylic varnish in Example 1 was placed in an Eirich Mixing Reactor R02Vac, and pressure was reduced at 80° C. and toluene was then distilled off. After atmospheric pressure was returned, 250 parts by weight of dodecanoic diacid (average particle diameter=1 μm) and 150 parts of isobutanol were put thereto, and they were then dispersed at 80° C. for 5 minutes. Afterward, 400 parts by weight of water was added thereto, and the pressure was reduced again. In consequence, the temperature of the system immediately lowered to 30° C., and the powder coating material composition was ground by a dispersion force of a dispersing machine, whereby solid particles having a particle diameter of 1 to 10 mm were obtained. Afterward, the same procedure as in Example 1 was conducted to obtain a thermosetting clear powder coating material.

Comparative Example 1

An acrylic varnish in Example 1 was placed in a reactor equipped with a thermometer, a thermostat, a stirrer, a condenser and a vacuum pump, and toluene was then removed by distillation under reduced pressure. Afterward, the material was discharged, and then cooled to obtain a solid resin. The thus obtained solid resin was ground by the use of a Henschel mixer. Next 1,000 parts by weight of the ground solid resin and 250 parts by weight of dodecanoic diacid (average particle diameter=1 μm) were dry-blended by the Henschel mixer, and they were then molten and kneaded by an extruder. At this time, an outlet temperature was 120° C. Next, after cooling, the mixture was ground by a pin disc mill, and then filtered through a filter of 150 mesh to obtain a thermosetting clear powder coating material.

Comparative Example 2

The same procedure as in Comparative Example 1 was conducted except that an outlet temperature at melting and kneading by an extruder was 100° C., thereby obtaining a thermosetting clear powder coating material.

Coating Film Performance Test

Coated plates were prepared in the following manner by the use of the thermosetting clear powder coating materials obtained in Examples 1 to 5 and Comparative Examples 1 and 2, and they were then subjected to a coating film performance test. The results are shown in Table 1. A time which was taken to prepare a powder coating material inclusive of a washing time of a device is also described. (Note) A in Table 1 is isobutanol.

Preparation of a Coating Film

An epoxy cationic electrodeposited coating material was electrodeposited on a dull steel plate chemically treated with zinc phosphate and having a thickness of 0.8 mm so that the thickness of a dry film is 20 μm, and on the baked electrodeposited coating film, a car intercoat surfacer was baked so that the thickness of the dry coating film is 20 μm. Afterward, wet sanding was performed by the use of a sand paper of #400, followed by draining and drying. Next, Magicron Base Coat HM-22 (trade name, metallic coating material, made by Kansai Paint Co., Ltd.) was applied so that the thickness of a cured coating film is about 15 μm, and it was then baked and cured at 140° C. for 30 minutes to obtain test materials. Next, on each of the test materials, each of the thermosetting clear powder coating materials obtained Examples 1 to 5 and Comparative Examples 1 and 2 was electrostatically coated so that a film thickness might be 70 μm, and heating and curing were then done at 160° C. for 30 minutes by an oven.

Test Procedure

Coating film appearance: The appearance of a finished coating film was visually observed, and it was then evaluated in consideration of gloss feeling and smooth feeling on the basis of the following standards.

⊚: Good.

○: The smooth feeling was slightly poor but the gloss feeling was good.

Δ: The smooth feeling and the gloss feeling were slightly poor.

x: The smooth feeling and the gloss feeling were poor.

60° Gloss: A mirror reflectance at 60° was measured in accordance with JIS K-5400.

Smoothness: A center line surface coarseness was measured by the use of a surface coarse meter (trade name Surfcom, made by Toyo Seimitsu co., Ltd.).

Pellet flow properties: 0.8 g of a powder coating material was molded under a pressure of 30 kg/mm$^2$ into a cylindrical pellet having a diameter of 13 mm and a height of about 4 mm, and the pellet was put on a horizontally held aluminum plate. Next, heating flow was given at 160° C. for 10 minutes, and at this time, a length of an enlarged portion of the pellet was measured.

Acid resistance: 0.4 cc of a 40 wt % aqueous sulfuric acid solution was dropped on the surface of a coating film, and it was then heated for 15 minutes on a hot plate heated to 80° C. Afterward, it was washed with water, and the coating film was then observed on the basis of the following standards.

⊚: The coating film was not changed and good.

○: An extremely slight step was observed along an interface between a dropped portion and an undropped portion.

x: The coating film was whitened.

Example 6

1,000 parts by weight of a polyester resin ER-7200 (trade name, made by Nippon Ester Co., Ltd., hydroxyl group-containing polyester resin, softening point=about 84° C., Tg=52° C. and hydroxyl number=21) was placed in an Eirich Mixing Reactor R02Vac, and then heated and molten to obtain a molten material at 110° C. Afterward, 600 parts by weight of titanium dioxide was added thereto, and then dispersed at 110° C. for 10 minutes. Afterward, 105 parts by weight of ε-caprolactam-blocked isophorone diisocyanate and 10 parts by weight of TK-1 (trade name, made by Takeda Chemical Industries, Ltd., tin-containing catalyst) were placed therein, and then dispersed at 110° C. for 5 minutes. Afterward, 600 parts by weight of water was added, and a pressure was then reduced, whereby a temperature immediately lowered to 30° C. The resultant powder coating material composition was ground by a dispersion force of a dispersing machine, whereby solid particles having a particle diameter of 1 to 10 mm were obtained. Afterward, the solid particles were dried under reduced pressure for 1 hour while dispersed, and the dried particles were then ground by a pin disc mill. Next, the ground composition was filtered through a filter of 150 mesh to obtain a thermosetting enamel powder coating material.

Example 7

1,539 parts by weight (solid content=1,000 parts by weight) of an acrylic varnish (number average molecular weight=7,000, solvent=toluene, resin solid content=65% by weight, resin softening point=about 85° C. and Tg=50° C.) comprising 40% by weight of glycidyl methacrylate, 10% by weight of styrene, 20% by weight of methyl methacrylate and 30% by weight of n-butyl acrylate was placed in an Eirich Mixing Reactor R02Vac, and a pressure was reduced at 110° C. and toluene was then distilled off. After atmospheric pressure was returned, 600 parts by weight of titanium dioxide as added thereto, and then dispersed at 110° C. for 10 minutes. Next, 290 parts by weight of dodecanoic diacid (average particle diameter=1 μm) was placed therein, and a stirring speed was then accelerated. When the temperature rose up to 120° C. over about 5 minutes by stirring heat, 600 parts by weight of water was added, and the pressure was reduced again. In consequence, the temperature of the system immediately lowered to 30° C., and the resultant powder coating material composition was ground by a dispersion force of a dispersing machine, whereby solid particles having a particle diameter of 1 to 10 mm were obtained. Afterward, the solid particles were dried under reduced pressure for 1 hour while dispersed, and the dried particles were then ground by a pin disc mill. Next, the ground composition was filtered through a filter of 150 mesh to obtain a thermosetting enamel powder coating material.

Example 8

1,539 parts by weight (solid content=1,000 parts by weight) of an acrylic varnish in Example 7 was placed in an Eirich Mixing Reactor R02Vac, and a pressure was reduced at 110° C. and 400 parts by weight of toluene was then distilled off. After atmospheric pressure was returned, 600 parts by weight of titanium dioxide was added thereto, and then dispersed at 110° C. for 10 minutes. Afterward, the pressure reduction was performed again, and remaining toluene was then distilled off. Next, 290 parts by weight of dodecanoic diacid (average particle diameter=1 μm) was placed therein, and then dispersed at 110° C. for about 5 minutes.

Afterward, 500 parts by weight of water was added, and the pressure was reduced again. In consequence, the temperature of the system immediately lowered to 30° C., and the resultant powder coating material composition was ground by a dispersion force of a dispersing machine, whereby solid particles having a particle diameter of 1 to 10 mm were obtained. Afterward, the solid particles were dried under reduced pressure for 1 hour while dispersed, and the dried particles were then ground by a pin disc mill. Next, the ground composition was filtered through a filter of 150 mesh to obtain a thermosetting enamel powder coating material.

Example 9

308 parts per weight of an acrylic varnish (solid content=200 parts by weight) of Example 7, 600 parts by weight of titanium dioxide and 200 parts by weight of toluene were placed in a 2 liter stainless steel vessel, and the mixture was then stirred for 15 minutes by a stirring machine. Afterward, dispersion was carried out for 15 minutes by a desk sand mill using glass beads to prepare a white pigment paste. Next 1,231 parts by weight (solid content=800 parts by weight) of the acrylic varnish in Example 7 was placed in an Eirich Mixing Reactor R02Vac. and 1,108 parts by weight of the above-mentioned white pigment paste was slowly added thereto with stirring. Afterward, a pressure was reduced at 110° C. and toluene was then distilled off. Next, 290 parts by weight of dodecanoic diacid (average particle diameter=1 μm) was placed therein, and a stirring speed was then accelerated. When the temperature rose up to 120° C. over about 5 minutes by stirring heat, 600 parts by weight of water was added, and the pressure was reduced again. In consequence, the temperature of the system immediately lowered to 30° C., and the resultant powder coating material composition was ground by a dispersion force of a dispersing machine, whereby solid particles having a particle diameter of 1 to 10 mm were obtained. Afterward, the solid particles were dried for 1 hour under reduced pressure while dispersed, and the dried particles were then ground by a pin disc mill. Next, the ground composition was filtered through a filter of 150 mesh to obtain a thermosetting enamel powder coating material.

Comparative Example 3

1,000 parts by weight of the polyester resin ER-7200 used in Example 6, 105 parts by weight of e-caprolactam-blocked isophorone diisocyanate, 10 parts by weight of TK-1 used in Example 6 and 600 parts by weight of titanium dioxide were dry-blended at room temperature by a Henschel mixer, followed by melting and kneading by an extruder. Next, after cooling, the mixture was ground by a pin disc mill, and the ground composition was then filtered through a filter of 150 mesh to obtain a thermosetting enamel powder coating material.

Comparative Example 4

The acrylic varnish of Example 7 was placed in a reactor equipped with a thermometer, a thermostat, a stirrer, a condenser and a vacuum pump, and toluene was then removed by distillation under reduced pressure. Afterward, the material was discharged, and then cooled to obtain a solid resin. The thus obtained solid resin was ground by the use of a Henschel mixer. Next 1,000 parts by weight of the ground solid resin, 250 parts by weight of dodecanoic diacid and 600 parts by weight of titanium dioxide were dry-blended at room temperature by the Henschel mixer, and afterward, the same procedure as in Comparative Example 3 was conducted to obtain a thermosetting enamel powder coating material.

Coated plates were prepared in the following manner by the use of the thermosetting enamel powdery coating materials obtained in Examples 6 to 9 and Comparative Examples 3 and 4, and they were then subjected to a coating film performance test. The results are shown in Table 2. A time which was taken to prepare a powder coating material inclusive of a washing time of a device is also described.

Preparation of the coated plates

The thermosetting enamel powder coating materials obtained in Examples 6 to 9 and Comparative Examples 3 and 4 were electrostatically coated respectively on dull steel plates chemically treated with zinc phosphate and having a thickness of 0.8 mm so that a film thickness might be 60 μm, and they were then heated and cured at 160° C. for 30 minutes by an oven to obtain the desired coated plates.

Table 2 Test Procedure

Coating film appearance: The surface of a coating film was visually observed, and it was then evaluated on the basis of the following standards.

○: Smoothness was good, and a defect such as shrinkage was not observed.

Δ: Smoothness was poor, and a defect such as shrinkage was observed.

x: Smoothness was noticeably poor, and a defect such as shrinkage was noticeably observed.

60° Gloss: It was the same as in the case of Table 1.

Curing properties: The surface of the coating film was strongly rubbed with a gauze impregnated with xylene by a finger tip 10 times by reciprocation, and the appearance of the coating film was then visually evaluated.

○: Any defect was not present on the coating film, and curing properties were good.

○: Scratches were slightly observed on the surface, and the curing properties were poor.

x: The surface was dissolved, and the curing properties were noticeably poor.

Workability: Extrusion was carried out by the use of an Erichsen working tester. An extrusion distance (mm) until a crack and a peel occurred was measured.

Example 10

1,539 parts by weight (solid content=1,000 parts by weight) of an acrylic varnish (number average molecular weight=7,000, solvent=toluene, resin solid content=65% by weight, resin softening point=about 85° C. and Tg=50° C.) comprising 35% by weight of glycidyl methacrylate, 60% by weight of methyl methacrylate and 5% by weight of isobutyl acrylate was placed in an Eirich Mixing Reactor R02Vac, and a pressure was reduced at 110° C. and toluene was then distilled off. After atmospheric pressure was returned, 250 parts by weight of dodecanoic diacid (average particle diameter—1 μm) was placed therein, and a stirring speed was then accelerated. When the temperature rose up to 120° C. over about 5 minutes by stirring heat, 333 parts by weight (solid content=50 parts by weight) of a fine particle aqueous dispersion obtained in Preparation Example 1 given below was added, and then dispersed at 90° C. for 5 minutes. Afterward, 250 parts by weight of water was added, and the pressure was reduced again. In consequence, the temperature of the system immediately lowered to 30° C., and the resultant powder coating material composition was ground by a dispersion force of a dispersing machine, whereby solid particles having a particle diameter of 1 to 10 mm were obtained. Afterward, the solid particles were dried for 1 hour under reduced pressure while dispersed, and the dried particles were then ground by a pin disc mill. Next, the ground composition was filtered through a filter of 150 mesh to obtain a thermosetting powder coating material containing the fine particles.

Preparation Example 1

670 parts of distilled water was placed in a reactor equipped with a nitrogen introduction pipe, a thermostat, a stirrer and a reflux condenser, and 10 parts by weight of styrene, 45 parts by weight of n-butyl methacrylate and 45 parts by weight of n-butyl acrylate were dispersed therein. Next, 2 parts by weight of sodium persulfate was added at 80° C., and after a reaction was carried out for 4 hours, 0.5 part by weight of sodium persulfate was further added. Afterward, the reaction was done for additional 1 hour to obtain a fine particle aqueous dispersion in which a resin solid content was 15% by weight, a particle diameter of the fine particles was 0.31 $\mu$m, and a glass transition temperature of the fine particles was −15° C.

Example 11

The same procedure as in Example 10 was conducted except that the fine particles aqueous dispersion obtained in Preparation Example 1 described above was replaced with a fine particle aqueous dispersion obtained in Preparation Example 2 given below, thereby obtaining a thermosetting powder coating material containing the fine particles.

Preparation Example 2

670 parts of distilled water was placed in a reactor equipped with a nitrogen introduction pipe, a thermostat, a stirrer and a reflux condenser, and 10 parts by weight of styrene, 10 parts by weight of methyl methacrylate, 65 parts by weight of n-butyl methacrylate and 15 parts by weight of n-butyl acrylate were dispersed therein. Next, 2 parts by weight of sodium persulfate was added at 80° C., and after a reaction was carried out for 4 hours, 0.5 part by weight of sodium persulfate was further added. Afterward, the reaction was done for additional 1 hour to obtain a fine particle aqueous dispersion in which a resin solid content was 15% by weight, a particle diameter of the fine particles was 0.27 $\mu$m, and a glass transition temperature of the fine particles was 20° C.

Example 12

The same procedure as in Example 10 was conducted except that the fine particles aqueous dispersion obtained in Preparation Example 1 described above was replaced with a fine particles aqueous dispersion obtained in Preparation Example 3 given below, thereby obtained a thermosetting powder coating material containing the fine particles.

Preparation Example 3

670 parts of distilled water was placed in a reactor equipped with a nitrogen introduction pipe, a thermostat, a stirrer and a reflux condenser, and 10 parts by weight of styrene, 45 parts by weight of n-butyl methacrylate, 35 parts by weight of n-butyl acrylate and 10 parts by weight of 1,6-hexanediol diacrylate were dispersed therein. Next, 2 parts by weight of sodium persulfate was added at 80° C., and after a reaction was carried out for 4 hours, 0.5 part by weight of sodium persulfate was further added. Afterward, the reaction was done for additional 1 hour to obtain a fine particle aqueous dispersion in which a resin solid content was 15% by weight, a particle diameter of the fine particles was 0.30 $\mu$m, and a glass transition temperature of the fine particles was −5° C.

Comparative Example 5

The same procedure as in Example 10 was conducted except that the fine particles aqueous dispersion obtained in Preparation Example 1 described above was replaced with a fine particles aqueous dispersion obtained in Preparation Example 4 given below, thereby obtaining a powder coating material.

Preparation Example 4 (for comparison)

670 parts of distilled water was placed in a reactor equipped with a nitrogen introduction pipe, a thermostat, a stirrer and a reflux condenser, and 10 parts by weight of styrene, 45 parts by weight of methyl methacrylate and 45 parts by weight of n-butyl methacrylate were dispersed therein. Next, 2 parts by weight of sodium persulfate was added at 80° C., and after a reaction was carried out for 4 hours, 0.5 part by weight of sodium persulfate was further added. Afterward, the reaction was done for additional 1 hour to obtain a fine particle aqueous dispersion in which a resin solid content was 15% by weight, a particle diameter of the fine particles was 0.29 $\mu$m, and a glass transition temperature of the fine particles was 60° C.

Comparative Example 6

The acrylic varnish of Example 10 was placed in a reactor equipped with a thermometer, a thermostat, a stirrer, a condenser and a vacuum pump, and toluene was then removed by distillation under reduced pressure. Afterward, the material was discharged, and then cooled to obtain a solid resin. On the other hand, the fine particle aqueous dispersion obtained in Preparation Example 2 was put in a heat-resistant vessel, and methanol and dry ice were added thereto so as to become −40° C. The fine particle aqueous dispersion obtained in Preparation Example 1 was placed in an eggplant-type flask so that it might be thinly frozen on the inside of the eggplant-type flask. Next, this flask was set on a decompression device having a cold trap cooled with liquid nitrogen, followed by freeze-drying under a pressure of 1 mmHg or less for 8 hours. The thus obtained fine particles were milled in a mortar, and then filtered through a sieve of 150 mesh to obtain a fine powder. Next, 1,000 parts of the above-mentioned solid resin, 50 parts by weight of the fine powder and 250 parts by weight of dodecanoic diacid (average particle diameter=1 $\mu$m) were dry-blended at room temperature by a Henschel mixer, and they were then molten and kneaded by an extruder. After cooling, the mixture was ground by a pin disc mill, and then filtered through a filter of 150 mesh to obtain a thermosetting clear powder coating material containing the fine particles.

Comparative Example 7

The acrylic varnish of Example 10 was placed in a reactor equipped with a thermometer, a thermostat, a stirrer, a condenser and a vacuum pump, and toluene was then removed by distillation under reduced pressure. Afterward, the material was discharged, and then cooled to obtain a solid resin. Next, 1,000 parts by weight of the solid resin and 250 parts by weight of dodecanoic diacid (average particle diameter=1 μm) were dry-blended by a Henschel mixer, and they were then molten and kneaded by an extruder. Next, after cooling, the mixture was ground by a pin disc mill, and then filtered through a filter of 150 mesh to obtain a thermosetting powder coating material containing the fine particles.

Coated plates were prepared in the following manner by the use of the thermosetting powder coating materials containing the fine particles obtained in Examples 10 to 12 and Comparative Examples 5 and 7, and they were then subjected to a coating film performance test. The results are shown in Table 3. A time which was taken to prepare a powder coating material inclusive of a washing time of a device is also described.

Preparation of a coating film

The same test materials as in Example 1 were prepared, and on each of these test materials, each of the thermosetting powder coating materials containing the fine particles obtained in Examples 10 to 12 and Comparative Examples 5 to 7 were electrostatically coated so that a film thickness might be 70 μm, and heating and curing were then done at 160° C. for 30 minutes by a drying machine.

Test procedure

Coating film appearance: It was evaluated in the same manner as in the case of Table 1.

60° Gloss: It was the same as in the case of Table 1.
Antichipping properties:
  (1) Test instrument: Q-G-R Gravelometer (made by Q Panel Co., Ltd.)
  (2) Pebbles to be blown: ground pebbles having a diameter of 15 to 20 mm
  (3) Volume of pebbles to be blown: about 500 ml
  (4) Pressure of air to be blown: about 5 kg/cm$^2$
  (5) Temperature of test instrument: about −30° C.

Methanol and dry ice were placed in a heat-resistant vessel, and a temperature was then set to −30° C. or less. Next, the coated plate was put in the vessel, and the temperature was then adjusted to −30° C. Afterward, the coated plate was attached to a holding base, and about 500 ml of the ground pebbles was blown on the coated plate under a blowing air pressure of about 5 kg/cm$^2$. This operation was repeated 5 times. Afterward, a salt spray test was carried out for 1,000 hours in accordance with JIS Z2371, and after the panel was allowed to stand for 2 hours, a cloth tape was strongly pressed against the panel and promptly peeled. At this time, the presence or absence of rust and the peeling of the coating film were evaluated on the following standards.
  ⊚: The generation of the rust was not observed at all on the test piece of 7×7 cm.
  ○: The generation of the rust was observed at 2 to 5 positions on the test piece of 7×7 cm.
  ×: The generation of the rust was observed at 6 or more positions on the test piece of 7×7 cm.

Water-resistant adhesion test: A test piece was immersed in warm water at 40° C. for 10 days, and then drained and dried. A cross cut was given on the coated surface of the test piece, and a cellophane tape was struck thereon and then promptly peeled. The peeling state of a coating film at this time was evaluated on the basis of the following standards.

⊚: The coating film was not peeled off at all.
  ○: The coating film was partially peeled off.
  ×: Most or all of the coating film was peeled off.

According to a method for preparing a thermosetting powder coating material of the present invention, the thermosetting powder coating material can be prepared in a shorter time and in a simpler manner as compared with conventional melting and kneading methods, and the thermosetting powder coating material can be obtained more uniformly, even if a base resin, a crosslinking agent and a pigment are dispersed at a lower temperature than in the conventional melting and kneading methods. As a result, the obtained cured coating film is excellent in physical properties such as finishing properties, antichipping properties and adhesive properties, and so it can exert noticeable curing properties.

The priority documents JP 124047/97, JP 124048/97 and 124049/97 filed May 14, 1997, are incorporated herein by reference in its entirety.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

TABLE 1

|  | Example | | | | | Comparative Example | |
| --- | --- | --- | --- | --- | --- | --- | --- |
|  | 1 | 2 | 3 | 4 | 5 | 1 | 2 |
| Dispersion Temp. (° C.) | 120 | 100 | 80 | 120 | 80 |  |  |
| Added Solvent |  |  |  |  | A |  |  |
| Melting Kneading Outlet Temp. (° C.) |  |  |  |  |  | 120 | 100 |
| Evaluations |  |  |  |  |  |  |  |
| Coating Film Appearance | ⊚ | ⊚ | ○ | ⊚ | ⊚ | ○ | Δ |
| 60° Gloss | 90 | 91 | 88 | 90 | 91 | 86 | 82 |
| Smoothness (μm) | 2.0 | 2.5 | 5.5 | 2.3 | 1.3 | 6.5 | 9.2 |
| Pellet Flowability (mm) | 34.0 | 34.5 | 34.8 | 33.9 | 35.5 | 33.2 | 34.0 |
| Acid Resistance | ⊚ | ○ | ○ | ⊚ | ⊚ | ○ | Δ |
| Preparation Time (min) | 120 | 120 | 120 | 120 | 120 | 360 | 360 |

TABLE 2

|  | Example | | | | Comparative Example | |
| --- | --- | --- | --- | --- | --- | --- |
|  | 6 | 7 | 8 | 9 | 3 | 4 |
| Evaluations |  |  |  |  |  |  |
| Coating Film Appearance | ○ | ○ | ○ | ○ | Δ | Δ |

TABLE 2-continued

|  | Example | | | | Comparative Example | |
|---|---|---|---|---|---|---|
|  | 6 | 7 | 8 | 9 | 3 | 4 |
| 60° Gloss | 88 | 86 | 88 | 91 | 78 | 75 |
| Curing Properties | ○ | ○ | ○ | ○ | Δ | Δ |
| Workability (mm) | 5 | 4 | 4 | 5 | 3 | 2 |
| Preparation Time (min) | 150 | 180 | 180 | 200 | 240 | 330 |

TABLE 3

|  | Example | | | Comparative Example | | |
|---|---|---|---|---|---|---|
|  | 10 | 11 | 12 | 5 | 6 | 7 |
| Evaluations |  |  |  |  |  |  |
| Coating Film Appearance | ⊚ | ○ | ○ | x | Δ | ⊚ |
| 60° Gloss | 89 | 85 | 86 | 72 | 79 | 88 |
| Antichipping Properties | ○ | ○ | ○ | x | Δ | x |
| Water-resistant Adhesion | ○ | ○ | ○ | x | Δ | x |
| Preparation Time (min) | 140 | 140 | 140 | 140 | 140 | 360 |

What is claimed is:

1. A method for preparing a thermosetting powder coating material comprising:
   dispersing and mixing a base resin and a crosslinking agent in a dispersing and/or mixing machine equipped with a decompression device at a temperature in the range of 40 to 200° C., to form a dispersed mixture, said dispersed mixture optionally containing a solvent and a pigment;
   optionally eliminating at least a portion of said solvent under reduced pressure;
   adding water to said dispersed mixture;
   reducing the pressure and lowering the temperature of the dispersed mixture to a temperature equal to or less than the softening point of said dispersed mixture; and
   bringing the dispersed mixture into a powder state or a granule state by dispersion force of the dispersing and/or mixing machine.

2. A method according to claim 1, wherein said solvent is included in the dispersed mixture and comprises an organic solvent for dissolving the base resin and the crosslinking agent, and wherein said solvent is capable of being azeotropic with water.

3. A method according to claim 1, wherein the solvent is included in the dispersed mixture in an amount of 80% by weight or less based on the total solid content of the base resin and the crosslinking agent.

4. A method according to claim 1, wherein the pigment is included and comprises a pigment paste or solid pigment chips obtained by previously dispersing said base resin, said solvent and a pigment component.

5. A method according to claim 1, wherein said dispersing is conducted by heat fusion and/or by dissolving said base resin and said crosslinking agent in an organic solvent.

6. A method according to claim 1, wherein the dispersing comprises dispersing the base resin and the pigment under heating, adding the crosslinking agent thereto, and then performing heat fusion and/or dissolving in an organic solvent.

7. A method according to claim 1, wherein the dispersing comprises dispersing the base resin and the pigment in the solvent, distilling off the solvent under reduced pressure, adding the crosslinking agent, and then performing a heating fusion and/or a dissolving dispersion in an organic solvent.

8. A method according to claim 1, further comprising adding an aqueous dispersant having a glass transition temperature of 40° C. or less and comprising fine synthetic resin particles having a particle diameter of 0.01 to 1 μm to the dispersed mixture prior to adding water.

9. A method according to claim 1, wherein the amount of water added to the dispersed mixture is in the range of 2 to 120% by weight based on the total solid content of the base resin and the crosslinking agent.

10. A method according to claim 1, wherein the softening point of the dispersed mixture is in the range of 30 to 130° C.

11. A method according to claim 1, wherein the glass transition temperature of the base resin is in the range of 40 to 100° C.

12. A method according to claim 1, wherein the base resin is one or more selected from the group consisting of acrylic resins, polyester resins, epoxy resins, and fluororesins.

13. A method according to claim 1, wherein the number average molecular weight of the base resin is in the range of 1,000 to 100,000.

14. A method according to claim 1, wherein the crosslinking agent is one or more selected from the group consisting of polycarboxylic acids, polycarboxylic anhydrides, blocked polyisooyanate compounds, polyepoxy compounds, polyol compounds, and amino resins.

15. A method for preparing a thermosetting powdery coating material which comprises the steps of dispersing and mixing a base resin, a crosslinking agent and, if necessary, a thermosetting powdery coating material component containing a solvent and a pigment in a dispersing/mixing machine equipped with a decompression device at a temperature in the range of 40 to 200° C., eliminating the organic solvent under reduced pressure, if necessary, in the case that the organic solvent is present in the obtained dispersed mixture, adding water thereto, reducing the pressure and lowering the temperature of the dispersed mixture to a temperature of a softening point or less, and then bringing the dispersed mixture into a powder state or a granule state by the dispersion force of the dispersing/mixing machine.

* * * * *